United States Patent
Kim et al.

(10) Patent No.: US 9,097,958 B2
(45) Date of Patent: Aug. 4, 2015

(54) CAMERA MODULE

(71) Applicant: SAMSUNG ELECTRO-MECHANICS CO., LTD., Suwon (KR)

(72) Inventors: Jang Hun Kim, Suwon (KR); Hwan Jun Kang, Suwon (KR); Sang Jin Lee, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/055,778

(22) Filed: Oct. 16, 2013

(65) Prior Publication Data

US 2015/0037025 A1    Feb. 5, 2015

(30) Foreign Application Priority Data

Aug. 2, 2013    (KR) .......................... 10-2013-0091942

(51) Int. Cl.
    *G03B 17/02*    (2006.01)
(52) U.S. Cl.
    CPC ...................................... *G03B 17/02* (2013.01)
(58) Field of Classification Search
    USPC .......................................................... 396/535
    See application file for complete search history.

(56) References Cited

U.S. PATENT DOCUMENTS

| | | | |
|---|---|---|---|
| 5,852,754 A * | 12/1998 | Schneider | 396/427 |
| 2006/0051986 A1 * | 3/2006 | Asai et al. | 439/71 |
| 2006/0189183 A1 * | 8/2006 | Yang | 439/95 |
| 2008/0174692 A1 * | 7/2008 | Kusaki et al. | 348/374 |
| 2011/0317065 A1 * | 12/2011 | Lin et al. | 348/373 |
| 2012/0008935 A1 * | 1/2012 | Cheng et al. | 396/535 |
| 2013/0057974 A1 * | 3/2013 | Zhang et al. | 359/819 |
| 2013/0136437 A1 * | 5/2013 | Asakawa et al. | 396/55 |
| 2014/0028905 A1 * | 1/2014 | Kim | 348/374 |

FOREIGN PATENT DOCUMENTS

| | | |
|---|---|---|
| KR | 10-2008-0074546 | 8/2008 |
| KR | 10-0863800 B1 | 10/2008 |
| KR | 10-2010-0103969 A | 9/2010 |
| KR | 10-2012-0029819 | 3/2012 |

OTHER PUBLICATIONS

Office Action dated Dec. 30, 2014 for Korean Patent Application No. 10-2013-0091942 and its English summary provided by Applicant's foreign counsel.

* cited by examiner

*Primary Examiner* — Rochelle-Ann J Blackman
*Assistant Examiner* — Linda B Smith
(74) *Attorney, Agent, or Firm* — Ladas & Parry, LLP

(57) ABSTRACT

There is provided a camera module including: a housing including a lens barrel disposed therein; a first shield can coupled to the housing so that a lower end portion of an outer surface of the housing is exposed; a circuit board mounted at the lower end portion of the housing; and a second shield can covering the first shield can and the lower end portion of the housing, wherein the second shield can is provided with protrusion parts pressing an outer surface of the first shield can.

13 Claims, 8 Drawing Sheets

CAMERA MODULE

CROSS-REFERENCE TO RELATED APPLICATIONS

This application claims the priority of Korean Patent Application No. 10-2013-0091942 filed on Aug. 2, 2013, in the Korean Intellectual Property Office, the disclosure of which is incorporated in its entirety herein by reference.

BACKGROUND OF THE INVENTION

1. Field of the Invention

The present invention relates to a camera module.

2. Description of the Related Art

Recently, portable communications terminals such as cellular phones, personal digital assistants (PDA), portable personal computers, and the like, have generally been implemented with the ability to perform the transmission of video data as well as the transmission of text and audio data.

In accordance with this trend, portable communications terminals have been standardly equipped with camera modules have been has been recently installed basically in the in order to enable the transmission of the video data, video chatting, or the like.

Generally, such a camera module generates electromagnetic waves while being driven. In the case in which electromagnetic waves are emitted to the outside, an effect on other electronic components causing communication interference or malfunctioning may occur.

Therefore, in order to block electromagnetic interference (EMI) as described above, a shield can formed of metal is used. The shield can individually or collectively covers electronic components to serve to block the electromagnetic interference from having an effect thereon and serves to protect the electronic components from external impacts.

However, in the case of using only one shield can, a phenomenon in which electromagnetic waves are leaked to the outside may be generated, and even in the case of using two shield cans, an electrical short circuit may be generated between a soldering region in which an actuator for driving a lens barrel and a circuit board are electrically connected to each other and the shield cans.

SUMMARY OF THE INVENTION

An aspect of the present invention provides a camera module capable of increasing shielding efficiency of electromagnetic waves and preventing generation of an electrical short circuit by maintaining an interval between a second shield can and a circuit board.

According to an aspect of the present invention, there is provided a camera module including: a housing including a lens barrel disposed therein; a first shield can coupled to the housing so that a lower end portion of an outer surface of the housing is exposed; a circuit board mounted at the lower end portion of the housing; and a second shield can covering the first shield can and the lower end portion of the housing, wherein the second shield can is provided with protrusion parts pressing an outer surface of the first shield can.

The protrusion part may be depressed from an outer surface of the second shield can and protrude from an inner surface of the second shield can.

At least two protrusion parts may be formed on each side of the second shield can.

The circuit board may have soldering parts formed thereon in order to electrically connect an actuator for driving the lens barrel and the circuit board to each other.

The housing may have receiving grooves formed in the lower end portion thereof so as to receive the soldering parts formed on the circuit board therein.

The center of the protrusion part may be positioned in a width of the soldering part.

The second shield can may have a notch groove formed in a position corresponding to that of the soldering part in a lower end portion thereof.

The notch groove may have a width corresponding to that of the soldering part.

The protrusion part may be positioned over a lower end portion of the first shield can.

The protrusion part may be positioned in a position below a point equal to half of the height of the second shield can.

A lower end of the protrusion part contacting the first shield can may be positioned over a lower end portion of the first shield can, and an upper end of the protrusion part contacting the first shield can may be positioned in a position below a point equal to half of the height of the second shield can.

According to another aspect of the present invention, there is provided a camera module including: a housing including a lens barrel disposed therein; an actuator provided in the housing and driving the lens barrel; a first shield can coupled to the housing so that a lower end portion of an outer surface of the housing is exposed; a circuit board mounted at the lower end portion of the housing; and a second shield can covering the first shield can and the lower end portion of the housing, wherein the circuit board has soldering parts formed thereon in order to electrically connect the actuator and the circuit board to each other, and the second shield can is provided with protrusion parts so as to prevent the second shield can and the soldering part from contacting each other.

The protrusion part may protrude from an inner surface of the second shield can so that the second shield can and the first shield can are spaced apart from each other by a predetermined interval and contact an outer surface of the first shield can.

The protrusion part may be formed on the second shield can so as to be adjacent to the soldering part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
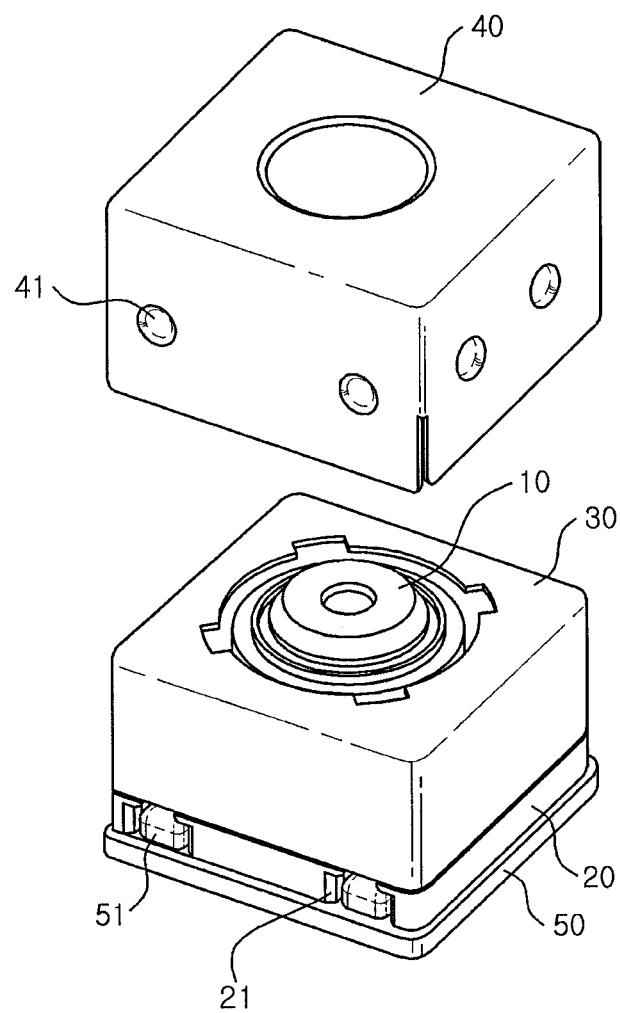
FIG. 1 is an exploded perspective view of a camera module according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
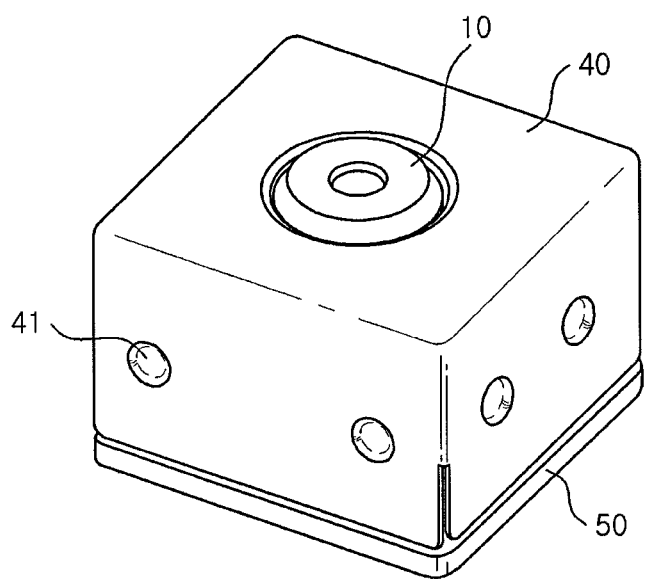
FIG. 2 is an assembled perspective view of the camera module according to the embodiment of the present invention.

FIG. 1 is an exploded perspective view of a camera module according to an embodiment of the present invention; and FIG. 2 is an assembled perspective view of the camera module according to the embodiment of the present invention.

Referring to FIGS. 1 and 2, the camera module according to the embodiment of the present invention may include a lens barrel 10, a housing 20, a first shield can 30, a second shield can 40, and a circuit board 50.

Terms with respect to directions will be defined hereinafter. An optical axis direction refers to a vertical direction based on the lens barrel 20, and a horizontal direction refers to a direction perpendicular to the optical axis direction.

The lens barrel 10 may have a hollow cylindrical shape so that at least one lens imaging a subject may be received therein, and the lens may be disposed in the lens barrel 10 along the optical axis.

The lens barrel 10 may be coupled to the housing 20. More specifically, the lens barrel 10 may be disposed in the housing 20.

Here, the lens barrel 10 may be moved in the optical axis direction for auto-focusing.

In order to move the lens barrel 10 in the optical axis direction, an inner portion of the housing 20 may be provided with an actuator (not shown) including a voice coil motor.

The actuator (not shown) may include a coil, a magnet, and a yoke, wherein the coil may move the lens barrel in the optical axis direction by attractive force and repulsive force with the magnet.

The magnet may form a predetermined magnetic field, generate driving force by electromagnetic influence between the magnet and the coil while power is applied to the coil, and move the lens barrel 10 in the optical axis direction by the driving force.

However, a moving unit of the lens barrel 10 is not limited to the actuator including the voice coil motor (VCM). That is, various schemes such as a mechanical driving scheme, a piezoelectric driving scheme using a piezoelectric element, or the like, may be used.

The lens barrel 10 may be moved by the operation as described above to perform an auto focusing or zooming function.

Meanwhile, the coil may include a position sensor disposed in the center thereof.

The position sensor may sense a current position of the lens barrel 10 and provide information on the current position to a controller (not shown), and the controller may control the movement of the lens barrel 10 using the information on the current position transmitted from the position sensor and information on a destination position to which the lens barrel 10 is to moved.

Since the position sensor is disposed at the center of the coil, a separate space for disposing the position sensor may not be required in the housing 20. Therefore, the actuator (not shown) may be miniaturized and a manufacturing tolerance in a manufacturing process may be decreased.

The housing 20 may have the circuit board 50 mounted at a lower end portion thereof.

More specifically, a cross-sectional area of the circuit board 50 in the horizontal direction may be larger than that of the housing 20 in the horizontal direction.

Therefore, when the circuit board 50 is mounted at the lower end portion of the housing 20, a portion of the circuit board 50 may protrude outwardly of the housing 20. A ground pad (not shown) may be formed on the portion of the circuit board 50 protruding outwardly of the housing 20.

In addition, the circuit board 50 may have soldering parts 51 formed thereon in order to electrically connect the actuator (not shown) for driving the lens barrel 10 and the circuit board 50 to each other, and the housing 20 may have receiving grooves 21 formed in the lower end portion thereof so as to receive the soldering parts 51 therein.

Here, the ground pad (not shown) may be formed in a region in which the soldering part 51 is not formed in the circuit board 50.

The first shield can 30 may be coupled to the housing 20 so as to enclose an outer surface of the housing 20. More specifically, the first shield can 30 may be coupled to the housing 20 so that a lower end portion of the outer surface of the housing 20 is exposed.

The first shield can 30 may serve to shield electromagnetic waves generated during driving the camera module.

That is, the camera module generates electromagnetic waves at the time of being driven. In the case in which electromagnetic waves are emitted to the outside, the electromagnetic waves may have an effect on other electronic components to cause communication interference or malfunctioning.

Therefore, in order to prevent electromagnetic waves from being emitted to the outside, the first shield can 30 may be coupled to the housing 20.

In this case, since the lower end portion of the outer surface of the housing 20 may be in the exposed state and be provided with the receiving grooves 21 so as to receive the soldering parts 51 formed on the circuit board 50, there may be a risk that electromagnetic waves will be leaked to the outside.

Therefore, the camera module according to the embodiment of the present invention may include the second shield can 40 covering the first shield can 30 and the lower end portion of the housing 20.

Meanwhile, the first shield can 30 and the second shield can 40 may have a through-hole (not shown) formed in an upper portion thereof so that external light may be input through the lens barrel 10, wherein the external light input through the through-hole (not shown) may be received by an image sensor (not shown) through the lens.

Here, the second shield can 40 may be provided with protrusion parts 41 pressing an outer surface of the first shield can 30.

At least two protrusion parts 41 may be formed on each side of the second shield can 40. However, the present invention is not limited thereto. That is, the number of protrusion parts 41 may correspond to that of soldering parts 51.

The protrusion part 41 may be described in detail below with reference to FIGS. 3 through 6.

Figure 3:
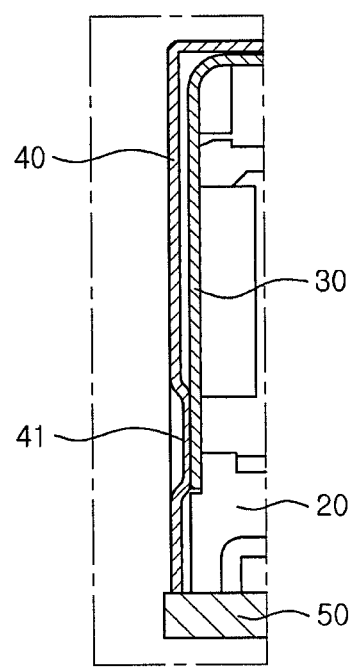
FIG. 3 is a partial cross-sectional view of the camera module according to the embodiment of the present invention.
Figure 4:
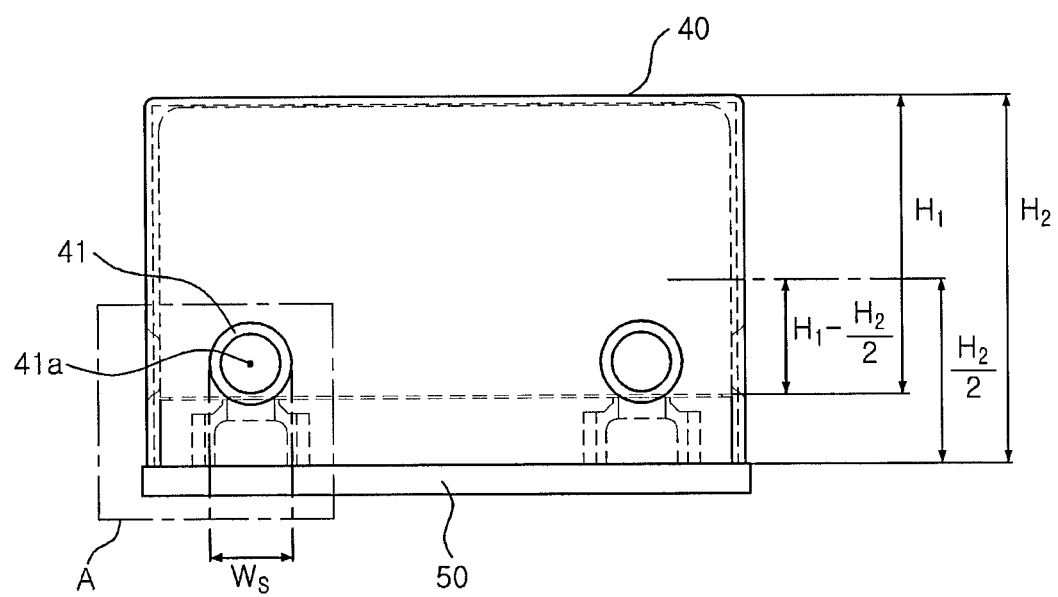
FIGS. 4 and 5 are side views of the camera module according to the embodiment of the present invention.
Figure 5:
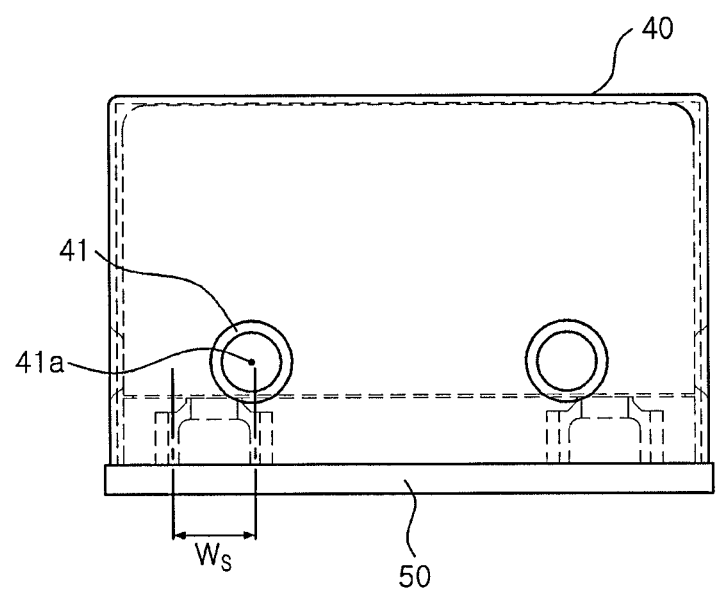

FIG. 3 is a partial cross-sectional view of the camera module according to the embodiment of the present invention; and FIGS. 4 and 5 are side views of the camera module according to the embodiment of the present invention.

Figure 6:
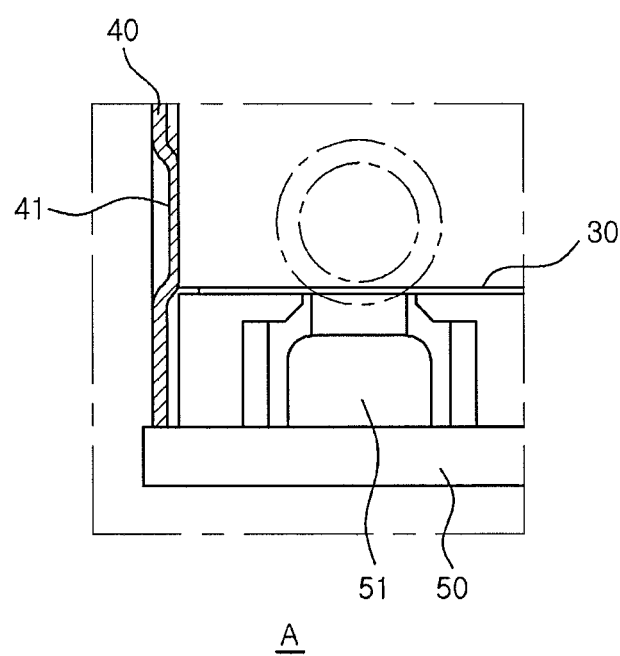
FIG. 6 is an enlarged view of part A of FIG. 4.

In addition, FIG. 6 is an enlarged view of part A of FIG. 4.

Referring to FIG. 3, the second shield can 40 included in the camera module according to the embodiment of the present invention may be provided with the protrusion part 41.

The protrusion part 41 may be depressed from an outer surface of the second shield can 40 and protrude from an inner surface of the second shield can 40.

Therefore, the protrusion part 41 protruding from the inner surface of the second shield can 40 may press the outer surface of the first shield can 30.

The protrusion part 41 may be formed on the second shield can 40 so as to be adjacent to the soldering part 51.

In the case in which the soldering part 51 is formed in excess of a predetermined range, when the second shield can 40 is assembled, the second shield can 40 and the soldering part 51 contact each other, such that there may be a risk that an electrical short-circuit will be generated.

Therefore, in the camera module according to the embodiment of the present invention, the protrusion part 41 is positioned to be adjacent to the soldering part 51, such that the second shield can 40 may maintain a predetermined interval from the first shield can 30 and the soldering part 51.

That is, the protrusion part 41 presses the outer surface of the first shield can 30, such that the inner surface of the second shield can 40 and the outer surface of the first shield can 30 may be spaced apart from each other by a predetermined interval.

In addition, the protrusion part 41 is formed on the second shield can 40 so as to be adjacent to the soldering part 51, whereby an internal between the inner surface of the second shield can 40 and the soldering part 51 may be maintained.

In the case that the protrusion part 41 is distant from the soldering part 51, there may be a risk that the inner surface of the second shield can 40 corresponding to the soldering part 51 will be bent toward the soldering part 51 by elastic force of the second shield can 40. In this case, the second shield can 40 and the soldering part 51 contact each other, such that an electrical short circuit may be generated.

However, in the camera module according to the embodiment of the present invention, the protrusion part 41 is positioned to be adjacent to the soldering part 51, such that an interval between the inner surface of the second shield can 40 and the soldering part 51 may be maintained.

Hereinafter, a position (a position in the horizontal direction and a position in the optical axis direction) of the protrusion part 41 will be described in detail with reference to FIGS. 4 through 6.

First referring to FIGS. 4 and 5, the protrusion part 41 may be positioned in a width Ws of the soldering part 51 (position of the protrusion 41 in the horizontal direction).

That is, the entire protrusion part 41 may be positioned in the width Ws of the soldering part 51, as shown in FIG. 4.

In this case, the protrusion part 41 is disposed to be adjacent to the soldering part 51, such that an interval between the inner surface of the second shield can 40 and the soldering part 51 may be maintained by the protrusion part 41.

However, the entire protrusion part 41 is not necessarily positioned in the width of the soldering part 51. That is, as shown in FIG. 5, even in the case in which a portion of the protrusion part 41 is outside of the soldering part 51, when the center 41a of the protrusion part 41 is positioned in the width of the soldering part 51, an interval between the inner surface of the second shield can 40 and the soldering part 51 may be maintained.

Referring to FIGS. 4 and 6, the protrusion part 41 may be positioned over a lower end portion of the first shield can 30 and in a position below a point equal to half of the height of the second shield can 40 (position of the protrusion part 41 in the optical axis direction).

More specifically, a lower end of the protrusion part 41 contacting the first shield can 30 may be positioned over the lower end portion of the first shield can 30, and an upper end of the protrusion part 41 contacting the first shield can 30 may be positioned under the half of the height of the second shield can 40.

A position of the protrusion part in the optical axis direction will be described in more detail with reference to FIG. 4.

It may be assumed that a length of the first shield can 30 in the optical axis direction, that is, a height of the first shield can 30 is $H_1$ and a length of the second shield can 40 in the optical axis direction, that is, a height of the second shield can 40 is $H_2$.

Therefore, the half of the height of the second shield can 40 may be $H_2/2$, and a length from the lower end portion of the first shield can 30 to the half ($H_2/2$) of the height of the second shield can 40 may be $H_1-H_2/2$.

That is, the protrusion part 41 may be positioned in a section of $H_1-H_2/2$ in the optical axis direction.

As described above, the protrusion part 41 is formed on the second shield can 40 so as to be adjacent to the soldering part 51, whereby the interval between the inner surface of the second shield can 40 and the soldering part 51 may be maintained and the electrical short circuit between the second shield can 40 and the soldering part 51 may be prevented.

Figure 7:
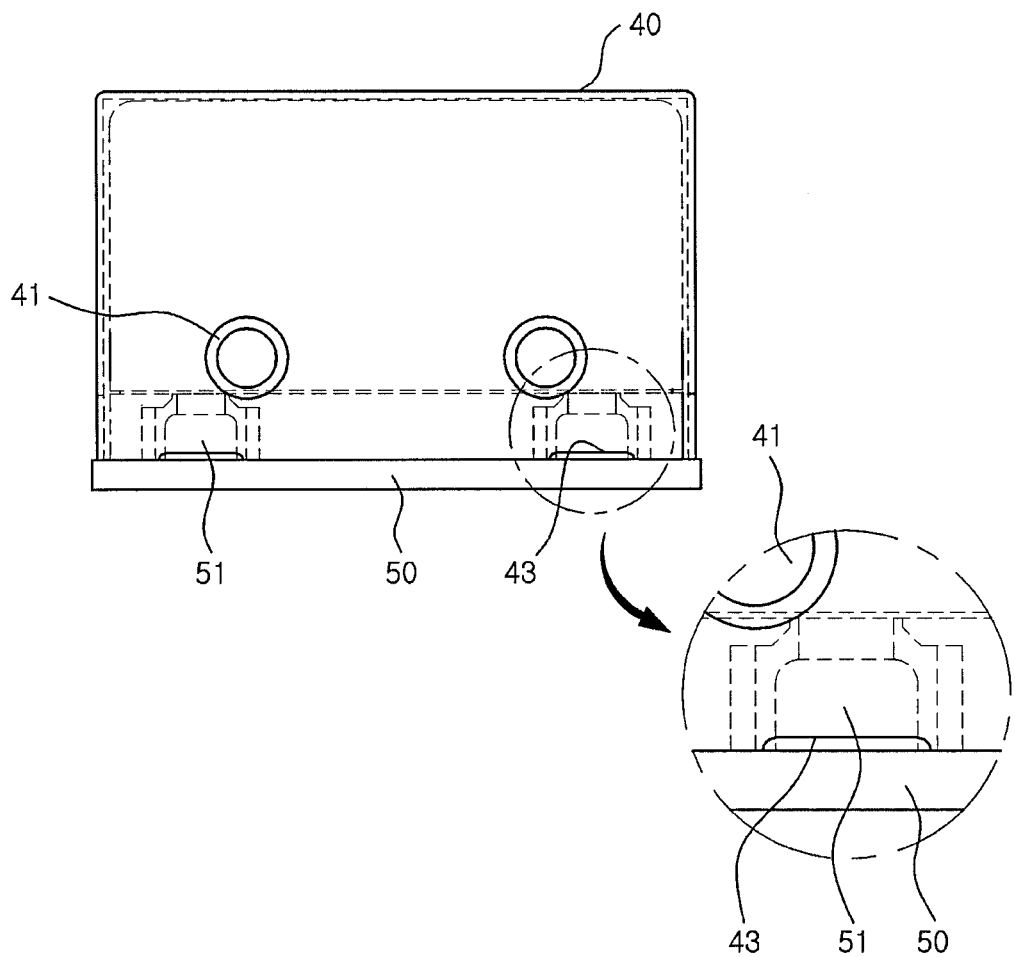
FIG. 7 is a side view showing a form in which a notch groove is applied to the camera module according to the embodiment of the present invention and an enlarged view thereof.
Figure 8:
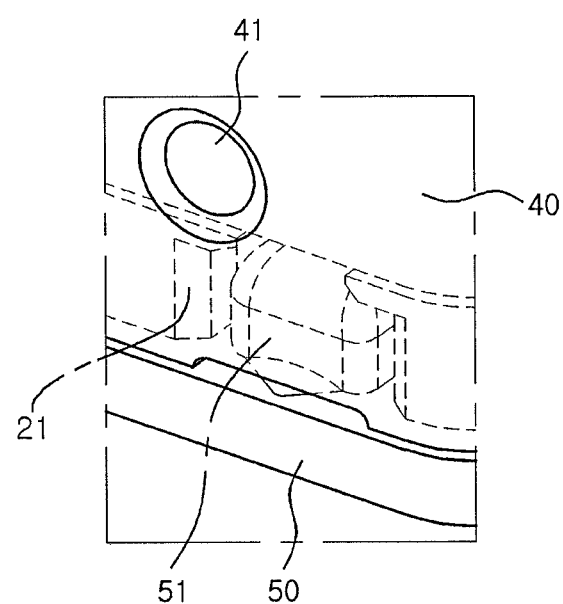
FIG. 8 is a partially enlarged perspective view of the notch groove of the camera module according to the embodiment of the present invention.

FIG. 7 is a side view showing a form in which a notch groove is applied to the camera module according to the embodiment of the present invention and an enlarged view thereof; and FIG. 8 is a partially enlarged perspective view of the notch groove of the camera module according to the embodiment of the present invention.

Referring to FIGS. 7 and 8, the second shield can 40 of the camera module according to the embodiment of the present invention may be provided with a notch groove 43.

That is, the notch groove 43 may be formed in a position corresponding to that of the soldering part 51 in the lower end portion of the second shield can 40.

In addition, the notch groove 43 may have a width corresponding to the width Ws of the soldering part 51.

The lower surface of the second shield can 40 and the circuit board 50 may form a predetermined space without contacting each other by the notch groove 43 in a region in which the notch groove 43 is formed.

Therefore, even in the case in which the soldering part 51 is formed in excess of a predetermined range, the soldering part 51 formed in excess of the predetermined range may be avoided by the space. As a result, the second shield can 40 and the soldering part 51 may not contact each other to prevent an electrical short circuit.

Through the above-mentioned embodiment, the camera module according to the embodiment of the present invention may decrease electrical resistance to increase shielding efficiency of electromagnetic waves.

In addition, the interval between the second shield can and the circuit board may be maintained to prevent the generation of an electrical short circuit.

As set forth above, in the camera module according to the embodiment of the present invention, the shielding efficiency of electromagnetic waves may be increased, and the interval between the second shield can and the circuit board is maintained, whereby the generation of the electrical short circuit may be prevented.

While the present invention has been shown and described in connection with the embodiments, it will be apparent to those skilled in the art that modifications and variations can be made without departing from the spirit and scope of the invention as defined by the appended claims.

What is claimed is:

1. A camera module comprising:
a housing including a lens barrel disposed therein;
a first shield can coupled to the housing so that a lower end portion of an outer surface of the housing is exposed;
a circuit board mounted at the lower end portion of the housing;
soldering parts formed on the circuit board in order to electrically connect an actuator for driving the lens barrel and the circuit board to each other; and
a second shield can covering the first shield can, the lower end portion of the housing and the soldering parts,
wherein the second shield can is provided with protrusion parts pressing an outer surface of the first shield can, and
wherein an inner surface of the second shield can is spaced apart from the outer surface of the first shield can and the soldering parts in a direction perpendicular to an optical axis of the lens barrel.

2. The camera module of claim 1, wherein the protrusion part is depressed from an outer surface of the second shield can and protrudes from an inner surface of the second shield can.

3. The camera module of claim 1, wherein at least two protrusion parts are formed on each side of the second shield can.

4. The camera module of claim 1, wherein the housing has receiving grooves formed in the lower end portion thereof so as to receive the soldering parts formed on the circuit board therein.

5. The camera module of claim 1, wherein the center of the protrusion part is positioned in a width of the soldering part.

6. The camera module of claim 1, wherein the second shield can has a notch groove formed in a position corresponding to that of the soldering part in a lower end portion thereof.

7. The camera module of claim 1, wherein the protrusion part is positioned over a lower end portion of the first shield can.

8. The camera module of claim 1, wherein a lower end of the protrusion part contacting the first shield can is positioned over a lower end portion of the first shield can, and an upper end of the protrusion part contacting the first shield can is positioned in a position below a point equal to half of the height of the second shield can.

9. The camera module of claim 6, wherein the notch groove has a width corresponding to that of the soldering part.

10. The camera module of claim 7, wherein the protrusion part is positioned in a position below a point equal to half of the height of the second shield can.

11. A camera module comprising:
a housing including a lens barrel disposed therein;
an actuator provided in the housing and driving the lens barrel;
a first shield can coupled to the housing so that a lower end portion of an outer surface of the housing is exposed;
a circuit board mounted at the lower end portion of the housing and having soldering parts formed thereon in order to electrically connect the actuator and the circuit board to each other; and
a second shield can covering the first shield can, the lower end portion of the housing and the soldering parts,
wherein the second shield can is provided with protrusion parts pressing an outer surface of the first shield can, such that the second shield can and the soldering parts are spaced apart from each other in a direction perpendicular to an optical axis of the lens barrel.

12. The camera module of claim 11, wherein the protrusion part protrudes from an inner surface of the second shield can so that the second shield can and the first shield can are spaced apart from each other by a predetermined interval and contacts an outer surface of the first shield can.

13. The camera module of claim 11, wherein the protrusion part is formed on the second shield can so as to be adjacent to the soldering part.

* * * * *